(12) United States Patent
Carlson (10) Patent No.: US 11,816,448 B2
(45) Date of Patent: *Nov. 14, 2023

(54) COMPRESSING LIKE-MAGNITUDE PARTIAL PRODUCTS IN MULTIPLY ACCUMULATION

(71) Applicant: Marvell Asia Pte, Ltd., Singapore (SG)

(72) Inventor: David Carlson, Haslet, TX (US)

(73) Assignee: Marvell Asia Pte, Ltd., Singapore (SG)

( * ) Notice: Subject to any disclaimer, the term of this patent is extended or adjusted under 35 U.S.C. 154(b) by 30 days.

This patent is subject to a terminal disclaimer.

(21) Appl. No.: 17/160,100

(22) Filed: Jan. 27, 2021

(65) Prior Publication Data

US 2021/0182026 A1    Jun. 17, 2021

Related U.S. Application Data

(63) Continuation of application No. 16/872,086, filed on May 11, 2020, now Pat. No. 10,949,168, which is a continuation of application No. 16/115,117, filed on Aug. 28, 2018, now Pat. No. 10,684,825.

(51) Int. Cl.
  *G06F 7/544* (2006.01)
  *G06F 7/533* (2006.01)

(52) U.S. Cl.
  CPC .......... *G06F 7/5443* (2013.01); *G06F 7/5332* (2013.01)

(58) Field of Classification Search
  CPC .................................................. G06F 7/5443
  See application file for complete search history.

(56) References Cited

U.S. PATENT DOCUMENTS

| 4,811,262 | A | 3/1989 | White |
| 6,035,316 | A | 3/2000 | Peleg et al. |
| 10,684,825 | B2 | 6/2020 | Carlson |
| 10,949,168 | B2 * | 3/2021 | Carlson ................ G06F 7/5443 |
| 2004/0186872 | A1 * | 9/2004 | Rupp ........................ G06F 7/57 |
| | | | 708/631 |
| 2008/0279274 | A1 | 11/2008 | Iliev |

* cited by examiner

*Primary Examiner* — Michael D. Yaary (57) ABSTRACT

An ALU is capable of generating a multiply accumulation by compressing like-magnitude partial products. Given N pairs of multiplier and multiplicand, Booth encoding is used to encode the multipliers into M digits, and M partial products are produced for each pair of with each partial product in a smaller precision than a final product. The partial products resulting from the same encoded multiplier digit position, are summed across all the multiplies to produce a summed partial product. In this manner, the partial product summation operations can be advantageously performed in the smaller precision. The M summed partial products are then summed together with an aggregated fixup vector for sign extension. If the N multipliers equal to a constant, a preliminary fixup vector can be generated based on a predetermined value with adjustment on particular bits, where the predetermined value is determined by the signs of the encoded multiplier digits.

20 Claims, 7 Drawing Sheets

| Multiplier Bits | Encoded Multiplier Digit |
|---|---|
| 0000 | +0 |
| 0001 | +1 |
| 0010 | +1 |
| 0011 | +2 |
| 0100 | +2 |
| 0101 | +3 |
| 0110 | +3 |
| 0111 | +4 |
| 1000 | -4 |
| 1001 | -3 |
| 1010 | -3 |
| 1011 | -2 |
| 1100 | -2 |
| 1101 | -1 |
| 1110 | -1 |
| 1111 | -0 |

COMPRESSING LIKE-MAGNITUDE PARTIAL PRODUCTS IN MULTIPLY ACCUMULATION

RELATED U.S. APPLICATIONS

This application is a continuation of and claims priority to the patent application with Ser. No. 16/872,086, filed May 11, 2020, by D. Carlson, entitled "Compressing Like Magnitude Partial Products in Multiply Accumulation," now U.S. Pat. No. 10,949,168, which is a continuation of and claims priority to the application with Ser. No. 16/115,117, filed Aug. 28, 2018, by D. Carlson, entitled "Compressing Like Magnitude Partial Products in Multiply Accumulation," now U.S. Pat. No. 10,684,825, both of which are hereby incorporated by reference in their entirety.

TECHNICAL FIELD

Embodiments of the present invention are related to the field of microprocessors, and in particular, to multiplication accumulation mechanisms in microprocessors.

BACKGROUND

Matrix multiplication has numerous applications in applied mathematics, physics, engineering, etc. Particularly, an important primitive of machine learning is matrix multiplication. In computing systems, matrix multiplication or a matrix product can be achieved by binary operations that produce a matrix from multiplying two matrices. In hardware, this can be accelerated by having hundreds or thousands or even more multiply accumulators. For example, the multiplication accumulation operation can be represented as:

$$A(1) \times B(1) + A(2) \times B(2) + \ldots + A(N) \times B(N).$$

Booth's algorithm is a prevalent computer arithmetic algorithm for multiplication. Conventionally, each single multiply of a pair of operands (e.g., $A(1) \times B(1)$) is first computed, which includes computing partial products (denoted as "pp") and then summing all these partial products to get a product of this pair. For example, using the Radix-8 Booth encoding, an 8-bit by 8-bit multiply has three partial products, as the multiplier is reduced into three digits through encoding. Any negative partial products for a single multiply are typically 1's complements and not sign extended. For example, the partial products are 10 bits each, namely pp0[9:0], pp1[12:3], pp2[15:6]. A 16-bit fixup vector (fixup[15:0]) is also computed for adding the "+1" needed to convert 1's complements to 2's complement as well as for correcting for the deficiency that the partial products were not sign extended. The product of this single multiply is then obtained by adding the fixup value to the partial products after shift and this has at least 16 bits in precision, represented as:

$$pp0[9:0] <<0 + pp1[12:3] <<3 + pp2[15:6] <<6 + \text{fixup}[15:0].$$

The final product of the N pairs of multiplies is then obtained by summing all the individual products of all the pairs. The adders used for summation of all the products need to have at least the precision of the product, which is 16 bits in this example.

SUMMARY

Disclosed herein is a multiply accumulation mechanism in an arithmetic logic unit (ALU) that enables computing a summation of multiple multiplications (or multiplies) with reduced requirements for circuitry precision in partial product accumulation.

Embodiments of the present disclosure provide an ALU that uses a multiply accumulator to generate a summation of multiple multiplications by summing up the individual partial products that correspond to the same bit positions of the multipliers across multiple multiplications. In some embodiments, given N pairs of multiplicand-multiplier operands of Q bits, a Booth encoder in the multiply accumulator encodes each multiplier into M digits. The multiply accumulator includes M partial product accumulators configured to produce M summed partial products respectively.

More specifically, each partial product accumulator has parallel multiply units (e.g., N units). Each multiply unit operates to multiply a particular encoded digit of one of the N multiplier with the corresponding multiplicand to produce a partial product. Thus, N partial products are generated in the partial product accumulator, which all correspond to a same digit position in the N encoded multipliers (e.g., the $1^{st}, \ldots,$ or $M_{th}$ digit). Negative partial products are inverted but may not be sign extended. The partial product accumulator adds the N partial products to produce a summed partial product. The M partial product accumulators produce M summed partial products which are subject to proper shifting and then added together, along with a fixup vector, to produce the final multiply accumulation. In this manner, the ADD operations within each partial product accumulator can advantageously be performed in a smaller bit precision than the final multiply accumulation. Smaller bit precision requirements naturally lead to less hardware and area, faster speed and better processing performance.

The multiply accumulator further includes fixup logic configured to generate an aggregated fixup vector to add the +1 in a selected bit to convert from 1's complement to 2's complement as well as to correct for the fact that the partial products were not sign extended. The aggregated fixup vector may be derived from M fixup vectors, each corresponding to a respective partial product accumulator.

The fixup logic further includes a pre-fixup generator for generating a preliminary fixup vector, which can be useful for the cases that the multipliers in the N pairs of operands are identical (or all equal to a constant). The preliminary fixup vector is determined by the signs of the M digits in the encoded constant multiplier and can be adjusted by adding a single 1 to a certain bit position to produce the final fixup. Thus, only one fixup vector needs to be added once with the M summed partial products. Compared with the conventional approach, which needs N fixup vectors for correcting the negation, the fixup mechanism according to embodiments of the present disclosure can effectively and advantageously eliminate N-1 vectors from the summation. As a result, the ALU circuitry design in a processor can be further simplified and optimized.

This summary contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

Embodiments of the present invention will be better understood from a reading of the following detailed description, taken in conjunction with the accompanying figures, in which like reference characters designate like elements.

DETAILED DESCRIPTION

Reference will now be made in detail to embodiments of the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail so as not to unnecessarily obscure aspects of the embodiments of the present invention. The drawings showing embodiments of the invention are semi-diagrammatic and not to scale and, particularly, some of the dimensions are for the clarity of presentation and are shown exaggerated in the drawing figures. Similarly, although the views in the drawings for the ease of description generally show similar orientations, this depiction in the figures is arbitrary for the most part. Generally, the invention can be operated in any orientation.

Overall, embodiments of the present disclosure provide an ALU capable of computing a summation of a plurality of multiplies by compressing like-magnitude partial products across multiple multiply accumulators. The partial products corresponding to a same digital position of the plurality of multipliers are summed to generate an accumulated partial product, which are then added together to generate the multiply accumulation.

In some embodiments, the multipliers are encoded before being used to generate the partial products, and the partial products corresponding to a same digital position of the encoded multipliers are summed to generate an accumulated partial product. Particularly, a Booth encoding algorithm is used to encode the multipliers into M digits, and M partial products are produced for each pair of multiply operands with each partial product in a smaller precision than the final product. The partial products resulting from the same encoded multiplier digit position (and hence of a like magnitude), are summed across all the multiplies to produce a summed partial product. In this manner, the summation operations effectively compress the partial products of a like-magnitude and can be advantageously performed in the smaller precision. The M summed partial products are then summed together with an aggregated fixup vector to correct for the fact that the partial products are not sign extended. If the multipliers are equal to a constant, the fixup vector can be generated based on a predetermined value with adjustments on particular bits. The adjustments are made based on the signs of the encoded multiplier digits and the number of multiplies in the accumulation.

Figure 1A:
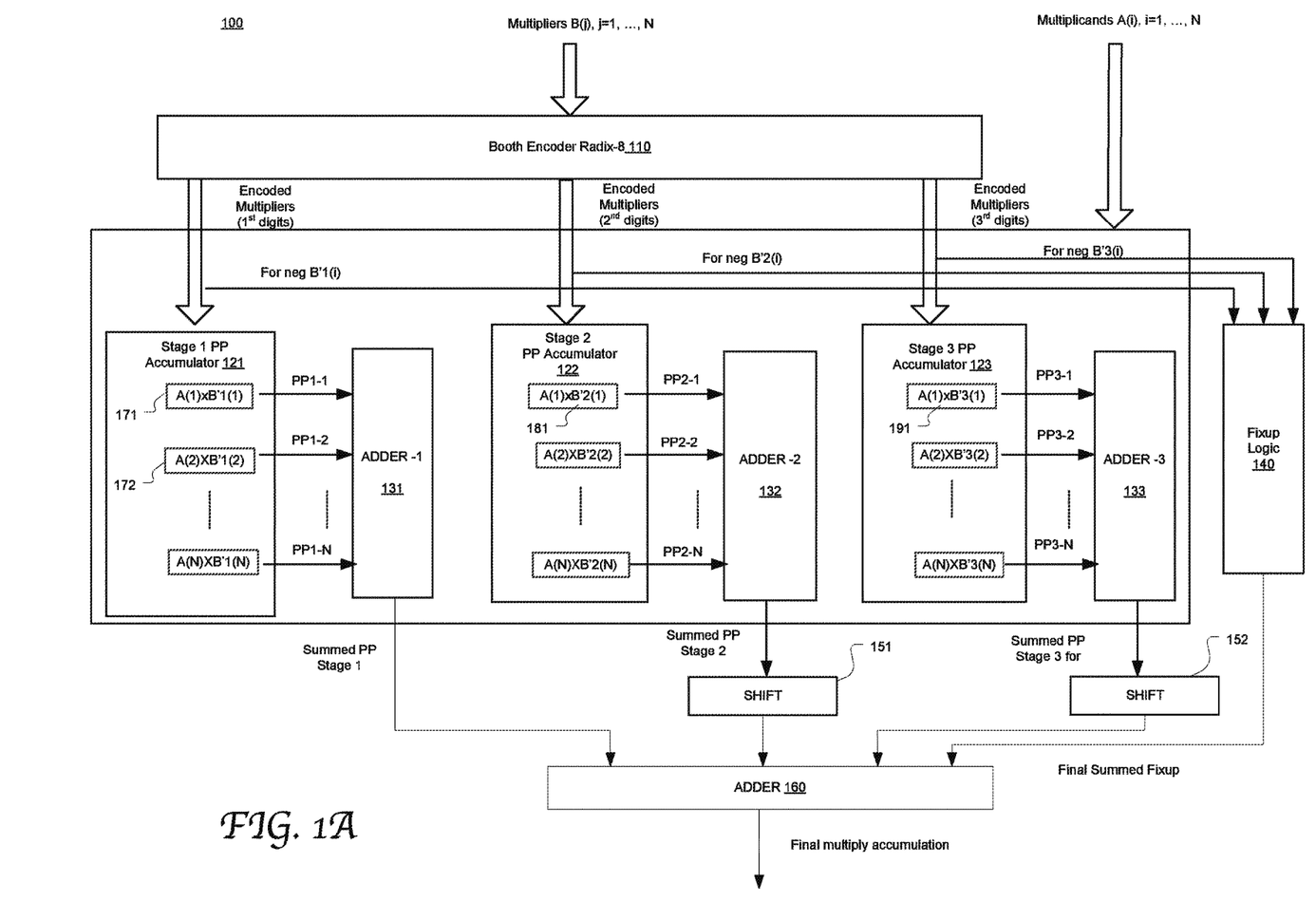
FIG. 1A illustrates the configuration of an exemplary multiply accumulator operable to compress partial products of a like-magnitude in accordance with an embodiment of the present disclosure.

FIG. 1A illustrates the configuration of an exemplary multiply accumulator 100 operable to compress partial products of a like-magnitude in accordance with an embodiment of the present disclosure. The multiply accumulator 100 includes a Booth Encoder 110, partial products accumulators 121-123, shift logic 151 and 152, fixup logic 140 and an adder 160. Each partial product accumulator is coupled to an adder 131, 132 or 133 of a smaller precision than the adder 160, as described in greater detail below.

Figure 2:
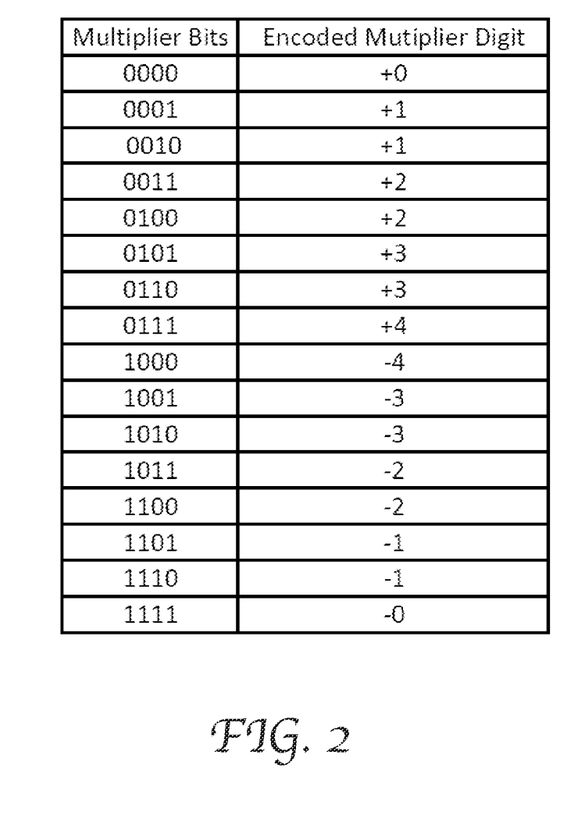
FIG. 2 is a table showing the groups of multiplier bits and the corresponding encoded digit according to Radix-8 Booth encoding.

The examples described herein in detail use Booth encoding; however any other suitable encoding mechanisms may also be used for generating partial products without departing from the scope of the present disclosure. In some other embodiments, a partial product may also be generated by directly multiplying a multiplicand with each digit of a multiplier without encoding. FIG. 2 is a table showing the groups of multiplier bits and the corresponding encoded multiplier digit according to a Radix-8 Booth encoding. For example, a group of "0001" in a multiplier is encoded into a +1; and a group of "1110" in a multiplier is encoded into −1.

Referring back to the illustrated example in FIG. 1, during operation, N pairs of multiplicand A(i) and multiplier B(i) are accessed, where i=1, 2, . . . , N. For instance, each of the operands has eight bits (Q=8), and thus the final product of each multiply should be at least 16 bits. The multiplicands A(1)-A(N) are input to the partial products accumulators of different stages 121-123. During Booth encoding, the 8-bit operands are subject to 2-bit extension and become 10 bits (R=10). The Radix-8 encoder 110 encodes each multiplier B(i) into an encoded multiplier having three digits (M=3) according to the algorithm as shown in FIG. 2. The three digits are supplied to the three partial product accumulators 121-123, respectively. The $j^{th}$ encoded digit for multiplier B(i) is denoted as B'j(i), where j=1, . . . , M.

The stage 1 partial product accumulator 121 uses N parallel multiplication units (e.g., 171 and 172) to multiply each multiplicand A(i) with the first digit in the encoded multiplier (denoted as B'1(i)), thereby generating N stage 1 partial products each in 10-bit precision, pp1(1)-pp1(N). These partial products all correspond to the same digit position (the first least significant digit) in the corresponding encoded multipliers and therefore are considered as having a like-magnitude. The negative partial products are not sign-extended at this point. ADDER-1 131 sums all the partial products pp1(1)-pp1(N) to produces a summed partial product. ADDER-1 131 may include an adder tree of multiple levels. Thereby, the partial products pp1(1)-pp1(N) are of a like-magnitude and are compressed into a summed partial product.

The partial product accumulators 122-123 have similar configurations as the partial product accumulator 121 and operate in a similar manner to generate the other two summed partial products respectively. Further, the partial products generated in the Stage 2 generator 122 (pp2-1-pp2-N) all correspond to the second digits of the encoded multipliers; namely, B'2(1)-B'2(N); and the partial products (pp3-1-pp3-N) generated in the Stage 3 generator 123 all correspond to the third digits of the encoded multipliers, namely B'3(1)-B'3(N). The shift logic 151 shifts the summed partial product for Stage 2 by a certain number of bits to the left, and the shift logic 152 shifts the summed partial product for Stage 3 by another number of bits to the left.

The fixup logic 140 is configured to generate an aggregated fixup vector of 16 bits to convert 1's complement to 2's complement as well as correct the deficiency that the partial products have not been sign-extended by the partial product accumulators 121-123. The 16-bit adder 160 then sums the summed partial products of all stages with the fixup vector to output the final multiply accumulation $$\sum_{i=1}^{N} A(i) \times B(i).$$

It will be appreciated that the numbers used in this example are merely exemplary and the present disclosure is not limited to any specific numbers of N, R, Q and M as defined above.

In some other embodiments, the multipliers are not encoded and so each digit in a binary multiplier is multiplied with a multiplicand directly. The partial products corresponding to the same multiplier digit position are summed to generate an accumulated partial product, which are then added together to generate the multiply accumulation. As the partial products are not signed, the fixup logic may not be used.

In the conventional art, the final product of each multiply of a multiplicand and multiplier is first calculated and the multiplication accumulation has to be performed on the final products which has at least twice the precision of the operands. However, according to embodiments of the present disclosure, adding the partial products within each partial product accumulator can be performed on the partial products of R-bit precision (R=10 in this example), which is smaller than the full precision (2Q=16 bits) of a final product. The reduced bit-precision requirements are translated to reduced hardware complexity and design area, reduced power consumption and enhanced speed in the ALU. It will be appreciated that any other suitable structures, algorithms and configurations may also be used to implement a multiply accumulator without departing from the scope of the present disclosure.

Figure 1B:
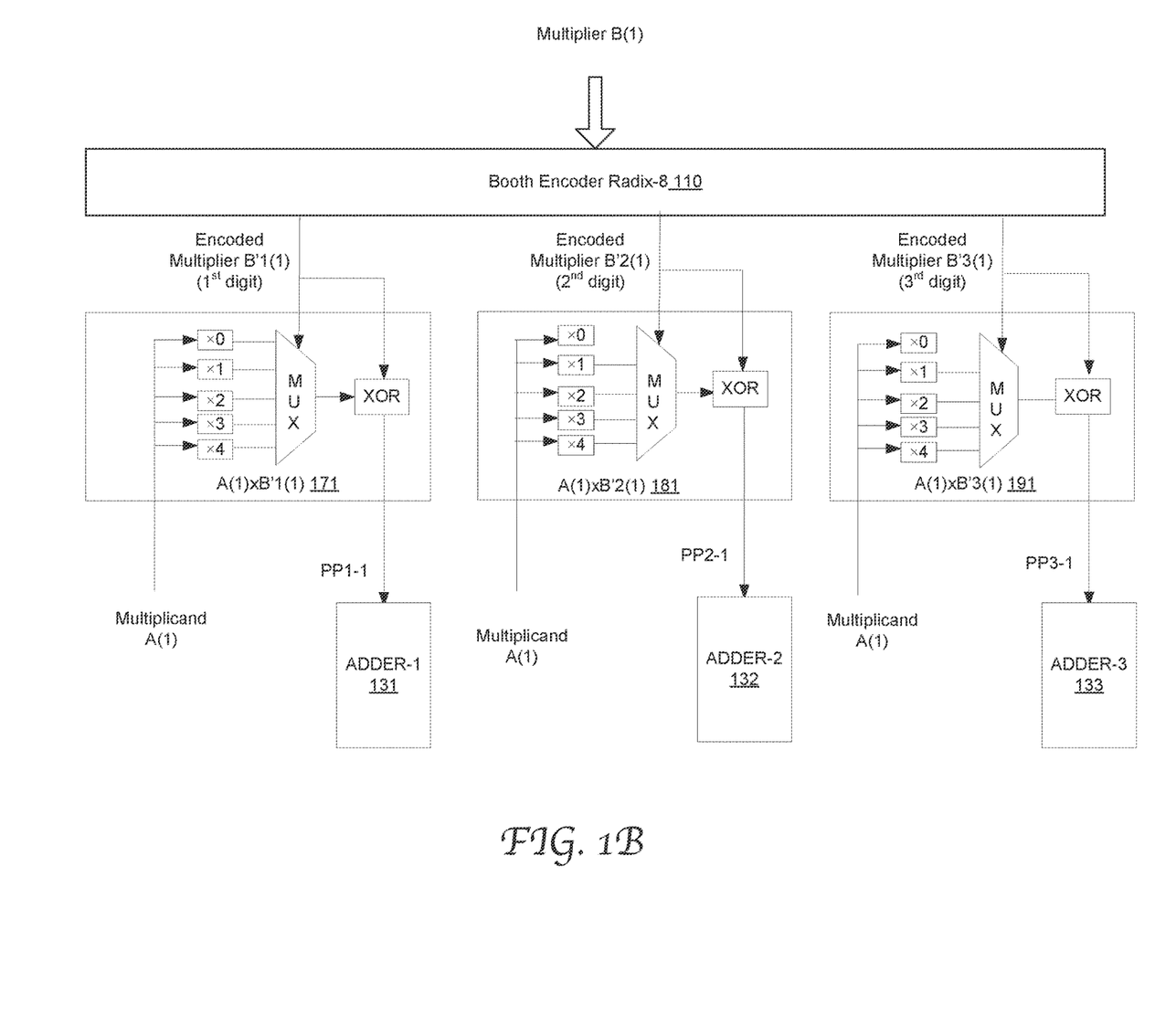
FIG. 1B illustrates the configuration of exemplary multiply units configured to generate partial products of an individual multiply in accordance with an embodiment of the present disclosure.

The present disclosure can be practiced using any suitable configuration of the individual multiplication units (e.g., 171 and 172) that are well known in art for generating partial products. FIG. 1B illustrates the configuration of exemplary multiplication units configured to generate partial products in the multiplication accumulator 100 in FIG. 1A in accordance with an embodiment of the present disclosure. The illustrated example shows the circuitry used to generate the three partial products for calculating A(1)×B(1), namely PP1-1, PP2-1 and PP3-1. For example, the multiplication unit 171 includes a 5:1 multiplexer (MUX) coupled to an XOR gate. The multiplicand A(1) is supplied to the logic module 101 and multiplied with 0, 1, 2, 3, and 4 (each corresponding to an encoded multiplier as shown in FIG. 2) in parallel. For example, the ×2 and ×4 units may each include a shifter and the ×3 includes a set of adders. The five multiplication results are input to the MUX 102 which outputs a selected result based on the magnitude of the encoded multiplier B'1(1). Based on the sign of B'1(1), the XOR 103 selectively operates to generate 1's complement of the selected result and output the partial product PP1-1 to the ADDER-1 131. By the same token, the multiplication units 181 and 191 are configured to generate the partial products PP2-1 and PP3-1 by multiplying A(1) with the encoded digits B'2(1) and B'2(1) respectively.

Figure 3:
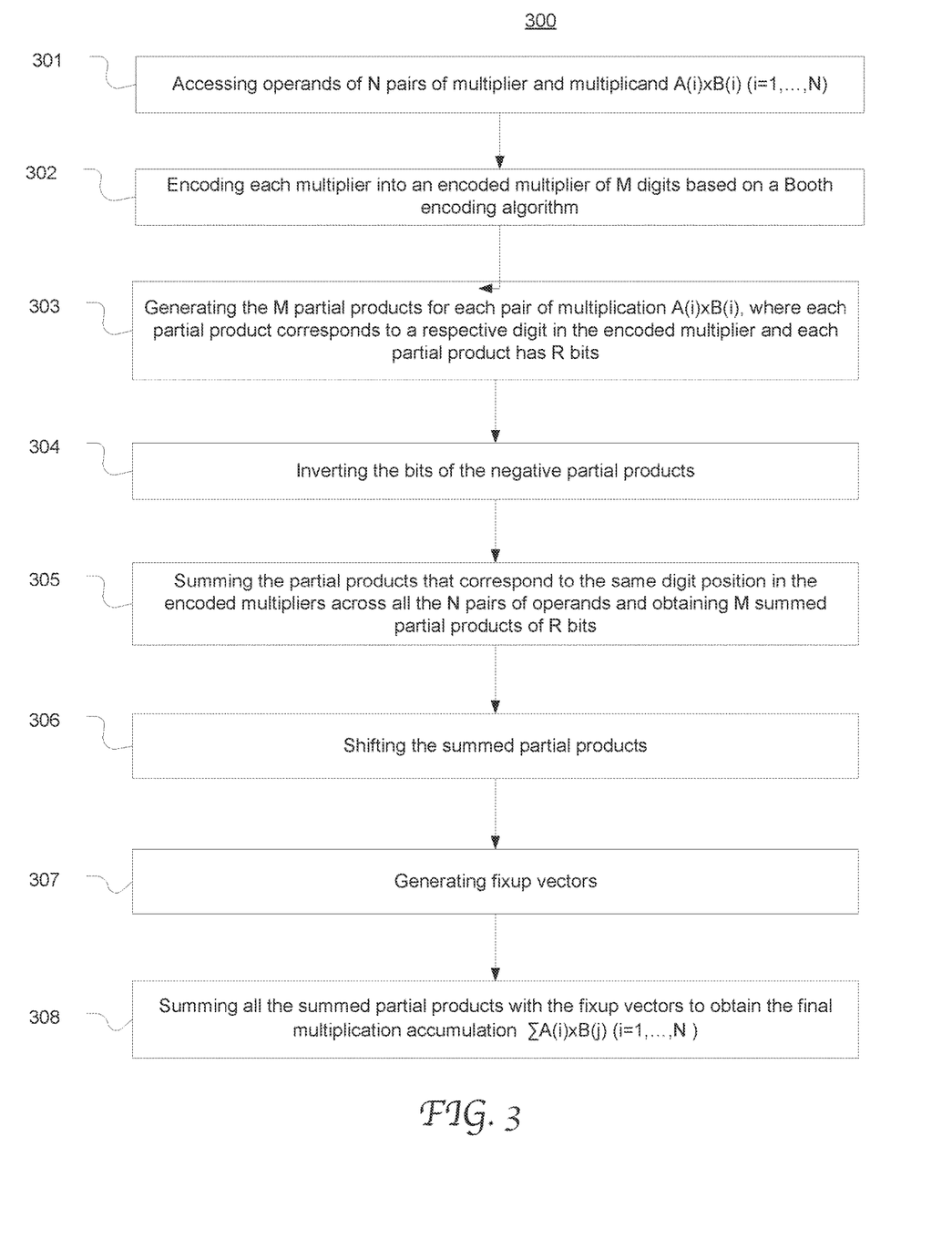
FIG. 3 is a flowchart depicting an exemplary process of computing a summation of a plurality of multiplications by using a multiply accumulator in an ALU according to an embodiment of the present disclosure.

FIG. 3 is a flowchart depicting an exemplary process 300 of computing a summation of a plurality of multiplications by using a multiply accumulator in an ALU according to an embodiment of the present disclosure. Process 300 may be performed by the exemplary multiply accumulator configured as shown in FIGS. 1A and 1B. However any other suitable configuration and implementation may also be used to perform process 300 without departing from the scope of the present disclosure.

For example, process 300 is performed to achieve a multiplication accumulation represented as $$\sum_{i=1}^{N} A(i) \times B(i).$$

More specifically, at 301, N pairs of multiplicand and multiplier operands are accessed, represented as A(1)-A(N) and B(1)-B(N) where i=1, . . . , N. Each operand has Q bits. At 302, each multiplier B(i) is encoded into an encoded multiplier B'(i) of M digits, each digit represented as B'j(i), j=1, . . . , M. At 303, for each pair of single multiply A(i) x B(i), M partial products are generated and each of the M partial products corresponds to a respective digit in the encoded multiplier B'j(i) and each partial product has R bits (e.g., 2Q≥RQ). At 304, the negative partial products are inverted but may not be subject to sign extension.

At 304, the partial products that corresponds to the same digit position (denoted as "j") in the encoded multipliers are accumulated across the N pairs of A(i) and B(i) to generate a respective summed partial product $$\sum_{i=1}^{N} A(i)B'j(i).$$

Thereby, M summed partial products are generated. At 305, the summed partial products are shifted by different numbers of bits according to the bit positions they correspond to in the final multiply accumulation.

At 306, the fixup vectors are generated for the negative partial products. A fixup vector is operable to add the +1 in a selected bit in a negative partial product, which is needed for conversion from 1's complement to 2's complement as well as for sign extension. An aggregated fixup vector may be derived from M fixup vectors each corresponding to a respective partial product accumulator.

In some embodiments, an accumulated fixup vector is generated for all the negative partial products generated in a respective partial product accumulator. The sign of each partial product is determined by the sign of the encoded multiplier digit that results in the partial product. As shown in FIG. 1, for each multiplier B(i), the Booth encoder 110 can output three encoded multiplier digits as well as their signs. Further, all the negative partial products that correspond to the same encoded multiplier digit position (j) are expected to have the same fixup vector. Thus, for each stage of partial product accumulator (121, 122 or 123), the fixup logic 140 may accumulate the fixups for the negative partial products based on the sign signals output from the Booth encoder 110 and generate an accumulated fixup vector for that stage. The accumulated fixup vectors of all the stages are then summed to generate a final aggregated fixup vector, which can be added to the M summed partial products to produce the final multiplication accumulation $$\sum_{i=1}^{N} A(i) \times B(i),$$

as at 308.

In some cases the multipliers in the N pairs of operands are nearly identical, or all equal to a constant. According to embodiments of the present disclosure, a preliminary fixup vector may be determined by the signs of the M digits in the encoded constant multiplier and can be adjusted by adding a single 1 to a certain bit position to produce the final fixup. In this manner, only one fixup vector needs to be added once with the summed partial products, for example which can be performed in one machine cycle. Compared with the conventional approach, which needs N fixup vectors for correcting the negation, the fixup mechanism according to embodiments of the present disclosure can effectively and advantageously eliminate N-1 vectors from the summation. As a result, the ALU circuitry design in a processor can be further simplified due to the reduced requirements for hardware complexity and design area. In the example illustrated herein, the optimization achieved by compression of like-magnitude partial products and using a preliminary fixup can result in nearly a two times area and power reduction compared with the conventional approach as presented above.

Figure 4:
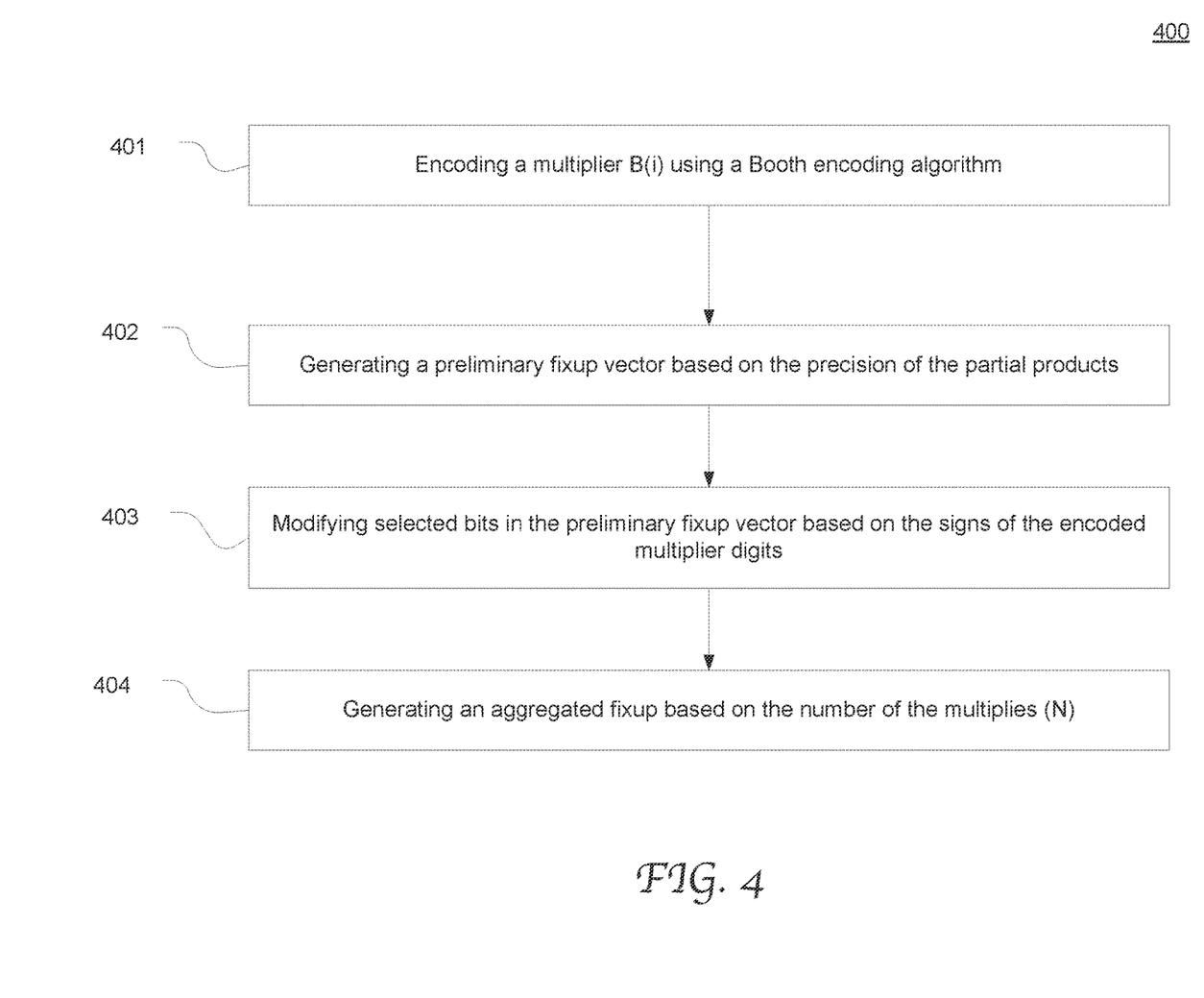
FIG. 4 is a flowchart depicting an exemplary process of computing an aggregated fixup vector based on a preliminary fixup vector for computing a multiplication accumulation in accordance with an embodiment of the present disclosure.

FIG. 4 is a flowchart depicting an exemplary process 400 of computing an aggregated fixup vector based on a preliminary fixup vector for computing a multiplication accumulation in accordance with an embodiment of the present disclosure. Process 400 is described in detail with reference to the example of calculating $$\sum_{i=1}^{N} A(i) \times B(i)$$

and may be performed by using the multiplication accumulator 100 in FIG. 1A for example. The multipliers all equal to C, B(i)=C, where C is a constant for i=1, ..., N. This process may consume only one machine cycle and needs only be performed once as long as the multiplier remains the same.

At 401, the constant multiplier C is encoded into an encoded multiplier of three digits using the Radix-8 encoding as shown in FIG. 2. At 402, a preliminary fixup vector is generated for sign extension and based on the precision of the summed partial products. At 403, selected bits in the preliminary fixup vector are adjusted based on the signs of the three encoded multiplier digits which are the same as the signs of the summed partial products. It will be appreciated that selections of these bit positions are specific to the encoding algorithm. The rest of the bits remain constant regardless of the multiplier or the encoded digits thereof.

For instance, three 10-bit summed partial products are resulted as follows, where the binaries for the negative ones are not sign extended. Herein, the hexadecimal numbers are used for illustration purposes and represent the corresponding binary values used in operations:

$pp1[9:0]=(-123)_{10}=(1110000100)_2=(-0x7b)_{16};$ $pp2[12:3]=(-15)_{10}=(1111100000)_2=(-0xf)_{16};$ $pp3[15:6]=(12)_{10}=(0000001100)_2=(0xc)_{16}.$

According to the precision of the partial products as well as the signs of the three encoded multiplier digits, a preliminary fixup vector can be determined as follows:
Pre_fixup[0]=1 (because pp0 is negative);
Pre_fixup[1]=0;
Pre_fixup[2]=0;
Pre_fixup[3]=1 (because pp1 is negative);
Pre_fixup[4]=0;
Pre_fixup[5]=0;
Pre_fixup[6]=0 (because pp2 is positive);
Pre_fixup[7]=0;
Pre_fixup[8]=0;
Pre_fixup[9]=0;
Pre_fixup[10]=0 (because pp0 is negative);
Pre_fixup[11]=1;
Pre_fixup[12]=1;
Pre_fixup[13]=0 (because pp1 is negative);
Pre_fixup[14]=1;
Pre_fixup[15]=1.

That is, Pre_fixup=$(0xd809)_{16}$. Particularly, the bits 0, 3, 6, 10 and 13 can be determined directly based on the signs of pp1, pp0 and pp2, as shown in the list above. Except for bits 0, 3, 6, 10 and 13, the remaining bits in the Pre_fixup vector can be determined (at 402) based on the precision of the partial products and regardless of the signs or magnitudes of the encoded multiplier digits.

If the number of fixup values equal to $2^n$, the Pre_fixup is further adjusted by adding a "1" to the $(n+Q)^{th}$ bit position. This addition can be implemented by an "ADD 1" operation. In this case, as n=1 ($2^2$=2 as pp0 and pp1 are both negative) and Q=10, an additional 1 is added to bit [10] at 403:

final_fixup=pre_fixup+$(0x400)_{16}$=$(0xd809)_{16}$= $(0xdc09)_{16}$.

Thus, a final aggregated fixup value (0xdc09) 16 is output at 404. The final multiplication accumulation is then obtained by summing pp0-pp1 and final fixup:

$(0x384)_{16}$+$(0x3f0)_{16}$<<3+$(0xc)_{16}$<<6+$(0xdc09)_{16}$= $(0x020d)_{16}$=$(525)_{10}$.

Figure 5:
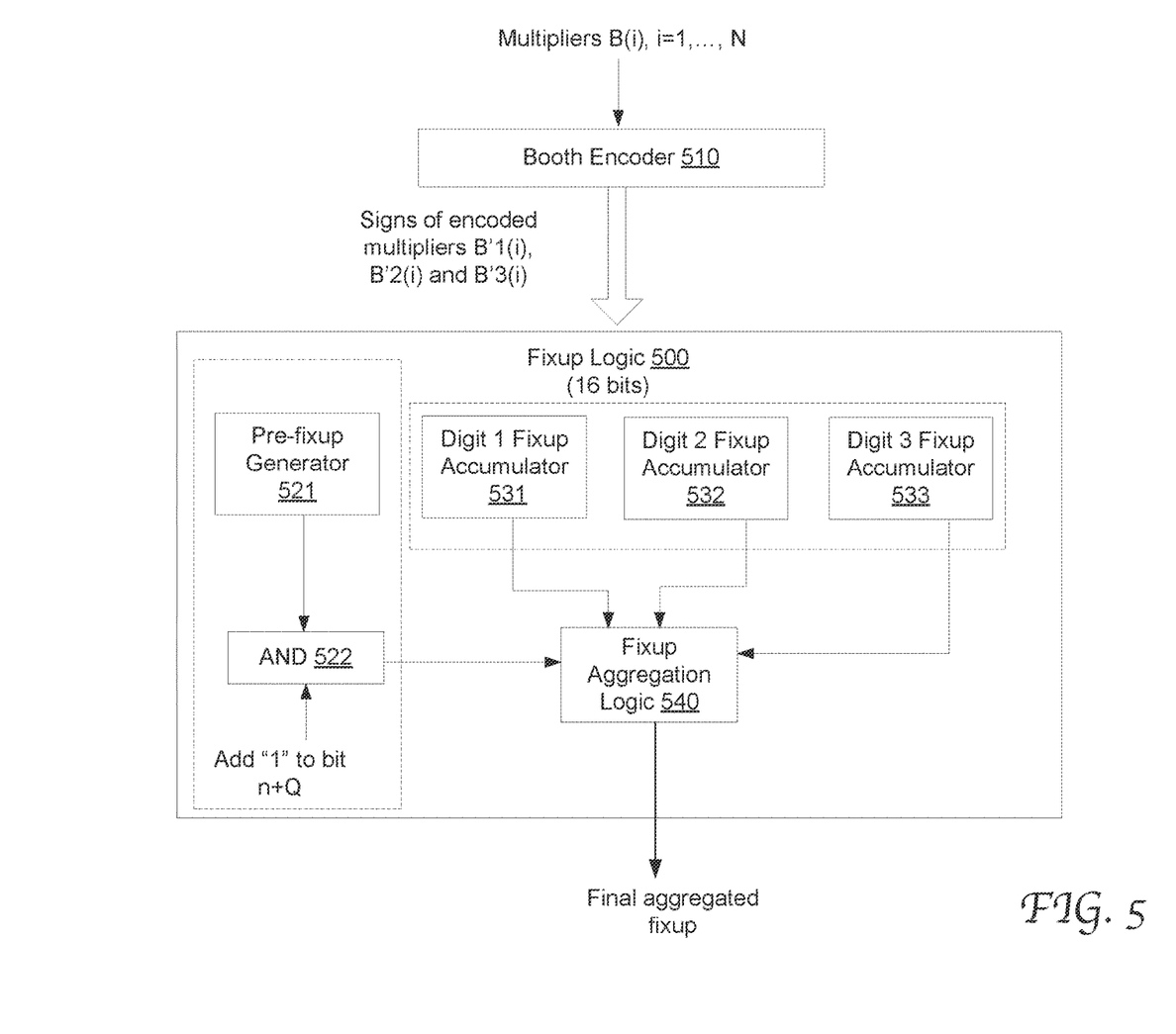
FIG. 5 illustrates the configuration of exemplary fixup logic used in a multiply accumulator in accordance with an embodiment of the present disclosure.

FIG. 5 illustrates the configuration of exemplary fixup logic 500 used in a multiply accumulator in accordance with an embodiment of the present disclosure. The fixup logic 500 include a pre-fixup generator 521, adder 522, stage fixup accumulators 531-532, and fixup sum logic 540. The fixup logic 500 is coupled to the Booth encoder 510 and can receive the signs of the digits for each multiplier, e.g., signs of B'1(i), B'2(i) and B'3(i), i=1, ..., N.

Each of the stage fixup logic (for digit 1, digit 2 or digit 3) operates to record the count of the negative encoded multiplier digit which is the number of negative partial products generate in a particular stage (j). An accumulated fixup vector for that stage is generated accordingly. The accumulated fixup vectors of all the stages are then summed to generate a final aggregated fixup vector, which can be added to the summed partial products to produce the final multiplication accumulation.

On the other hand, the pre-fixup generator 521 can be activated upon a determination that the multipliers in the N pairs of operands all equal to a constant. A preliminary fixup vector may be determined based on the signs of the M digits in the encoded constant multiplier. It can be adjusted by adding a single 1 to a certain bit position to produce the final aggregated fixup as described with reference to FIG. 4. In this path, accumulation of stage fixups may not be needed.

In either path, the final aggregated fixup effectively converts the negative partial products from 1's complement to 2's complement and make up the sign extensions.

Figure 6:
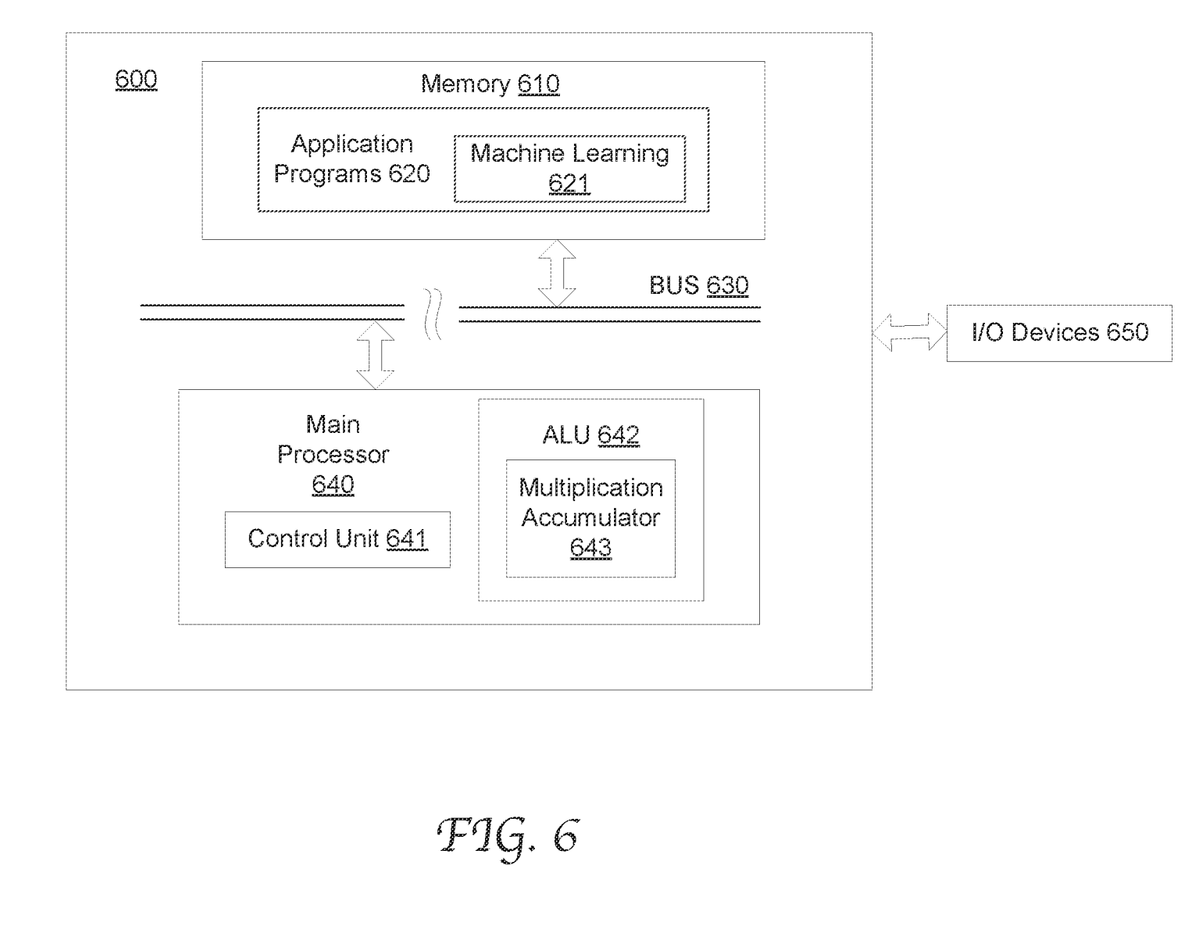
FIG. 6 illustrates the configuration of an exemplary computing system including a multiply accumulator in an ALU in accordance with an embodiment of the present disclosure.

FIG. 6 illustrates the configuration of an exemplary computing system 600 including a multiply accumulator 643 in an ALU 642 in accordance with an embodiment of the present disclosure. The computer system 600 may be a server, a general-purpose computer, a laptop, a smartphone, a network device or any other type of computing device. The system 600 includes memory 610, a bus 630, a main processor 640 and input/output devices 650, and may further include various other components that are well known in the art. The main processor 640 may be a central processing unit (CPU) or a graphics processing unit (GPU) or alike. The main processor 640 includes a control unit 641 and an ALU 642 which is equipped with a multiply accumulator for example as described in greater detail with reference to FIGS. 1 and 5. The memory stores an operating system (not shown) and application programs 620 including a machine learning program 621. The machine learning program 620 can generate matrix multiplication instructions including instructions for computing multiplication accumulations. The control unit 641 can decode the instructions and control the ALU 642, particularly the multiply accumulator 643, to execute the instructions and generate a multiplication accumulation result in accordance with the processes as described in greater detail with reference to FIGS. 3-4.

Although certain embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law. Any claimed embodiment of the invention does not necessarily include all of the objects or embodiments of the disclosure.

What is claimed is:

1. A method, comprising:
    accessing, by an arithmetic logic unit (ALU) of a processor, operands of pairs of multiplicands and multipliers, each pair of said pairs comprising a respective multiplicand of said multiplicands and a respective multiplier of said multipliers;
    for each pair of said pairs: multiplying, by said ALU; a respective digit in a multiplier of a pair of said pairs with a multiplicand of said pair, to produce partial products for each pair of said pairs;
    summing, by said ALU, said partial products across said pairs that result from a same digit position in respective multipliers of said pairs, to produce summed partial products; and
    adding, by said ALU, an aggregated fixup value with said summed partial products, wherein said aggregated fixup value corresponds to a correction value for negative partial products of said pairs, to produce a value representing a summed product of said pairs, and wherein each of said partial products comprises fewer bits than said value representing the summed product of said pairs.

2. The method of claim 1; further comprising encoding multipliers of said pairs using an encoding process to reduce a number of bits of each of said multipliers.

3. The method of claim 2, wherein said encoding process is a Booth encoding process.

4. The method of claim 2, further comprising, prior to said summing said partial products, inverting bits of a partial product of said partial products responsive to an indication that an encoded multiplier digit that results in said partial product is negative.

5. The method of claim 2, wherein said multipliers in said pairs are equal to a same constant, said method further comprising generating said aggregated fixup value by incrementing a selected bit of a fixup value, and wherein said fixup value is based on signs of said digits in an encoded multiplier resulting from encoding said same constant.

6. The method of claim 1, further comprising:
    generating fixup values comprising a fixup value for each partial product of said summed partial products based on a number of said negative partial products; and
    summing said fixup values for said summed partial products to produce said aggregated fixup value.

7. The method of claim 1, further comprising performing an arithmetic left shift on selected summed partial products of said summed partial products.

8. An arithmetic logic unit (ALU), comprising:
    a plurality of multiplier units; and
    a plurality of adder units coupled to said plurality of multiplier units,
    wherein said ALU accesses operands of pairs of multiplicands and multipliers, each pair of said pairs comprising a respective multiplicand of said multiplicands and a respective multiplier of said multipliers;
    wherein said multiplier units multiply, for each pair of said pairs, a respective digit in a multiplier of a pair of said pairs with a multiplicand of said pair, to produce partial products for each pair of said pairs; and
    wherein said adder units: sum said partial products across said pairs that result from a same digit position in respective multipliers of said pairs, to produce summed partial products; and add an aggregated fixup value with said summed partial products, wherein said aggregated fixup value corresponds to a correction value for negative partial products of said pairs, to produce a value representing a summed product of said pairs.

9. The ALU of claim 8, further comprising an encoder configured to encode each multiplier in said pairs into an encoded multiplier.

10. The ALU of claim 9, wherein each of said partial products is generated by multiplying a respective digit in the encoded multiplier of said pair with the multiplicand of said pair, and wherein each summed partial product of said summed partial products is generated by summing partial products of said pairs that result from a same digit position in the encoded multipliers.

11. The ALU of claim 9, wherein said encoder comprises a Booth encoder.

12. The ALU of claim 9, further comprising circuitry coupled to said multiplier units and configured to invert bits of a partial product of said partial products responsive to an indication from said encoder that an encoded multiplier digit that results in said partial product is negative.

13. The ALU of claim 9, wherein, responsive to a determination that said multipliers in said pairs are equal to a same constant, said adder units also add a "1" in a selected bit of a fixup value to produce said aggregated fixup value, wherein said fixup value is based on signs of the encoded multiplier digits resulting from encoding said same constant.

14. The ALU of claim 8, wherein said adder units also add a fixup value for said summed partial products to produce said aggregated fixup value, wherein said fixup value is based on a number of negative partial products associated with said summed partial products.

15. The ALU of claim 8, further comprising shifter logic coupled to said multiplier units, wherein said shifter logic is configured to perform an arithmetic left-shift on selected summed partial products of said summed partial products.

16. A system, comprising:
memory; and
a processor coupled to said memory, wherein said processor comprises:
  means for accessing operands of pairs of multiplicands and multipliers, each pair of said pairs comprising a respective multiplicand of said multiplicands and a respective multiplier of said multipliers;
  means for multiplying, for each pair of said pairs, a respective digit in a multiplier of a pair of said pairs with a multiplicand of said pair, to produce partial products for each pair of said pairs;
  means for summing said partial products across said pairs that result from a same digit position in respective multipliers of said pairs, to produce summed partial products; and
  means for adding an aggregated fixup value with said summed partial products, wherein said aggregated fixup value corresponds to a correction value for all negative partial products of said pairs, to produce a value representing a summed product of said pairs.

17. The system of claim 16, further comprising:
means for encoding multipliers of said pairs using an encoding process to reduce a number of bits of each of said multipliers; and
means for inverting bits of a partial product prior to said summing said partial products and responsive to an indication that an encoded multiplier digit that results in said partial product is negative.

18. The system of claim 16, further comprising:
means for encoding multipliers of said pairs using an encoding process to reduce a number of bits of each of said multipliers, wherein multipliers in said pairs are equal to a same constant; and
means for generating said aggregated fixup value by incrementing a selected bit of a fixup value, wherein said fixup value is based on signs of said digits in an encoded multiplier resulting from encoding said same constant.

19. The system of claim 16, further comprising:
means for generating a fixup value for each summed partial product of said summed partial products based on a number of said negative partial products; and
means for summing fixup values for said summed partial products to produce said aggregated fixup value.

20. The system of claim 16, further comprising means for performing an arithmetic left-shift on selected summed partial products of said summed partial products.

* * * * *